P. ARBOGAST.
GLASS FURNACE.

No. 188,328. Patented March 13, 1877.

Witnesses: F. A. Pollock, G. Smith

Inventor: Philip Arbogast
By Connolly Bros & W. Tighe, Attorneys

UNITED STATES PATENT OFFICE.

PHILIP ARBOGAST, OF PITTSBURG, PENNSYLVANIA, ASSIGNOR OF A PART OF HIS RIGHT TO FRANCIS T. PLUNKETT AND DOMINICK O. CUNNINGHAM, OF SAME PLACE.

IMPROVEMENT IN GLASS-FURNACES.

Specification forming part of Letters Patent No. 188,328, dated March 13, 1877; application filed October 31, 1876.

*To all whom it may concern:*

Be it known that I, PHILIP ARBOGAST, of Pittsburg, in the county of Allegheny and State of Pennsylvania, have invented certain new and useful Improvements in Glass-Furnaces; and I do hereby declare the following to be a full, clear, and exact description of the invention, such as will enable others skilled in the art to which it pertains to make and use it, reference being had to the accompanying drawings, which form part of this specification, in which—

Figure 1:
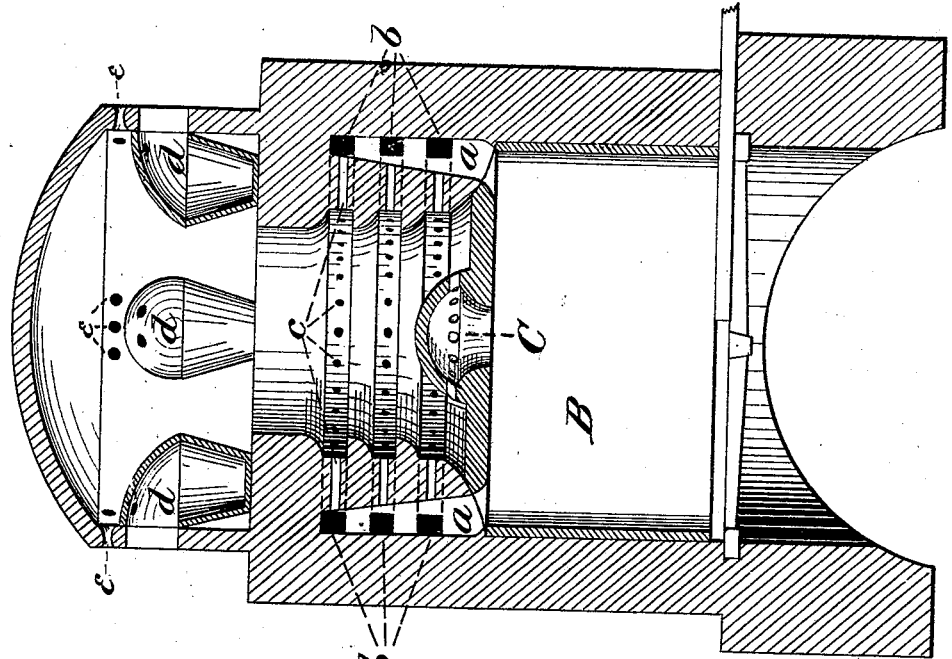
Figure 2:
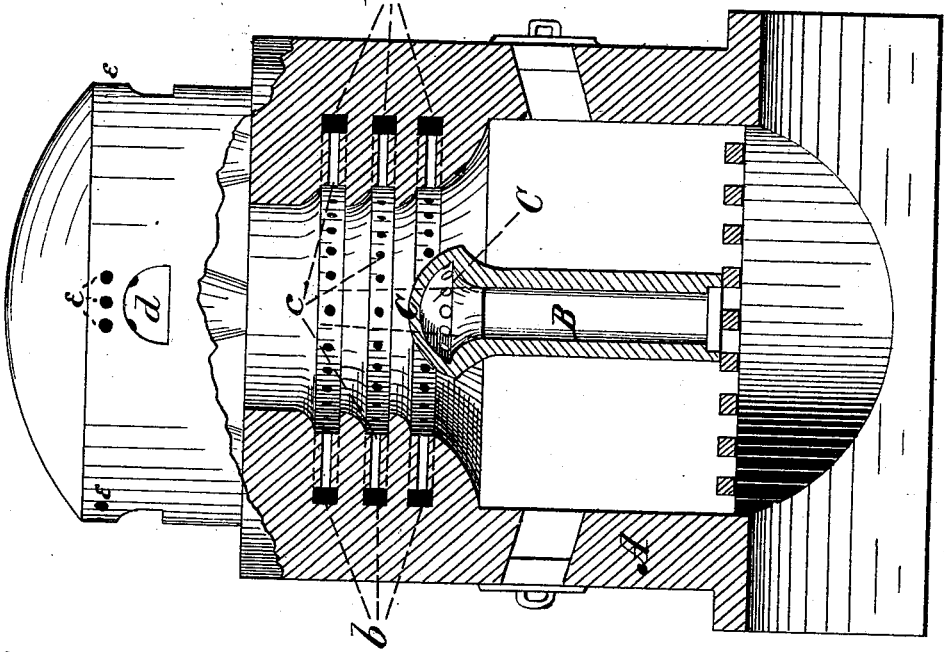

Figure 1 is a vertical section through the middle. Fig. 2 is a vertical section at right angles to that of Fig. 1.

This invention relates to improvements on the subject-matter of Letters Patent No. 180,517, issued to me August 1, 1876, and has reference particularly to the more thorough mingling of the heated air and gaseous products of the combustion-chamber, and to the protection of the contents of the pots from the intense heat evolved by this furnace.

To these ends my invention consists in constructing the furnace-throat with one or more annular air-passages, into which air passes through upward passages leading from the central air-heater, and out of which annular air-passages the hot air is projected into the throat by means of perforations leading therefrom; also, in surmounting the air-heater with a central hollow dome, perforated so as to spray the hot air equally into the core of the body of gaseous products; also, in circumferentially grooving or otherwise roughening the surface of the throat, for the purpose of breaking the continuity of the upward current of gaseous products, in order that the incoming heated air can become more intimately mingled therewith; and, finally, in the means of guarding the contents of the pots by a cover or fender having perforations near its upper and outer edge, so that while the draft is unobstructed, the flames work out at a point where they cannot harm or "sulphur" the glass. This is especially desirable in a "warming-in" as well as a reheating furnace, where the direct contact of such an intensely-hot flame might be disastrous in its effects upon the articles.

In the drawings, A designates the walls of the furnace proper, and B the air-heater, rising from the grate-bars.

The latter is of substantially the same construction as in my patent above referred to, except that it is open throughout its interior, instead of being perforated, this construction being simpler and quite as good for my present purpose. At the top, however, it opens only at the middle and at the ends. At the middle it opens into a hollow dome, C, or projection, rising part-way into the narrowed flue-throat, and perforated to spray the heated air in the core of the body of gaseous products. At each end the heater B opens into a passage, $a$, leading upwardly through the walls of the narrowed flue or throat, as shown in Fig. 1. It thus cuts into one or more annular air-passages, $b$, passing around the throat, each one of which delivers all the air it receives into the throat through a number of perforations, $c$, radially or otherwise built in the throat-walls.

By this means the air is first intensely heated in B, then divided into two portions, one of which ascends in dome C, and is thence projected or sprayed upon the core of the body of gaseous products rising in the throat, and the other portion, subdivided into two parts, passes over and up into the annular passages $b$ in the walls of the throat, whence they attack the gaseous body on its shell or exterior, the continuity of whose current is broken up by the ledges or projections formed by channeling the throat, or otherwise roughening its inside surface. Hence, the heated air is enabled to thoroughly penetrate the body of gaseous products, and to become completely commingled therewith.

If desired, the outer surface of dome C, or that of the upper portion of heater B, may be similarly constructed with projections or ridges.

The result of this mingling of the highly-heated air with the gaseous products of combustion in the fuel-chamber is to flash out a dazzling and intensely hot white flame, with even the poorest quality of fuel. The effect of such a flame on finished or partially finished glassware must be guarded against, and possible sulphuring prevented, in order to make the furnace meet all requirements. This I effect by constructing the pot guards or fenders $d$, separating the work-holes from the interior of the arch, with perforations on their tops, as shown, in order to get the required heat within or over the pots. These protect the pots or the articles from sulphuring and other deleterious consequences. The remainder of the draft finds its way through the openings $e$, disposed in any suitable manner in the arch-walls. Openings are provided in the walls A for the purpose of feeding fuel or "teasing" the fire.

Thus constructed, the furnace can be successfully run with any kind of fuel, and will, with any given quantity and quality of fuel, produce a saving in that item alone of from fifty to sixty per cent. on the amount consumed in the old-fashioned furnaces so long in general use. At the same time the furnace may be more quickly brought to a heat, and much more work accomplished at a "move," than has hitherto been possible.

Having thus fully described my invention, what I claim, and desire to secure by Letters Patent, is—

1. In a furnace wherein the gaseous products of combustion are inflamed by the introduction of heated air, a central sprayer projecting into the center of the flue of the combustion-chamber, and delivering heated air into the middle or core only of the body of such gaseous products, in order to inflame said body from the interior, substantially as described.

2. In a furnace as above described, the method of mingling the heated air and gaseous products, by simultaneously admitting one portion of the air to the core, and another to the shell or exterior, of the body of gaseous products, both in the flue of the combustion-chamber, substantially as described.

3. In a furnace as above described, the method of assisting the air to mingle with the body of gaseous products, by constructing the walls or interior of the throat with a ridged surface, in order to break up the continuity of the gaseous current, and thereby afford more complete access of air, substantially as specified.

4. In a furnace as above described, a perforated hollow dome, C, projecting upwardly into the flue of the combustion-chamber, in combination with an air-heater, B, arranged substantially as and for the purposes set forth.

5. The arrangement, in combination with a central air-heater, B, of the passages $a$ and $b$, and perforations $c$ in the walls of the throat, for the purpose of admitting the air heated in B to the exterior of the body of gaseous products, substantially as shown.

In testimony that I claim the foregoing I have hereunto set my hand this 18th day of October, 1876.

PHILIP ARBOGAST.

Witnesses:
  B. McKENNA,
  J. H. McCABE.